US012692720B2

(12) United States Patent
Everson

(10) Patent No.: US 12,692,720 B2
(45) Date of Patent: Jul. 28, 2026

(54) ALWAYS-ON LOCK INDICATOR DISPLAY TECHNOLOGIES

(71) Applicant: Schlage Lock Company LLC, Carmel, IN (US)

(72) Inventor: Jonathan Everson, Kokomo, IN (US)

(73) Assignee: Schlage Lock Company LLC, Carmel, IN (US)

( * ) Notice: Subject to any disclaimer, the term of this patent is extended or adjusted under 35 U.S.C. 154(b) by 93 days.

(21) Appl. No.: 18/656,861

(22) Filed: May 7, 2024

(65) Prior Publication Data

US 2025/0347147 A1 Nov. 13, 2025

(51) Int. Cl.
*E05B 17/22* (2006.01)

(52) U.S. Cl.
CPC .................................. *E05B 17/226* (2013.01)

(58) Field of Classification Search
CPC . G07C 9/00857; G07C 9/00817; E05B 41/00; Y10T 70/8027
See application file for complete search history.

(56) References Cited

U.S. PATENT DOCUMENTS 5,477,041 A 12/1995 Miron et al.
2004/0080403 A1* 4/2004 Eshel ................. G07C 9/00944 340/425.5
2015/0240526 A1 8/2015 Clary et al.
2020/0012998 A1 1/2020 Gillen et al.
2021/0029101 A1* 1/2021 Igari .................... G06K 7/1417
2022/0415104 A1* 12/2022 Mclachlan ............ G06F 3/0482
2023/0041148 A1* 2/2023 Sweeney ................. E05B 41/00

FOREIGN PATENT DOCUMENTS

CN 113595659 B 2/2024
JP 5759242 B2 8/2015
KR 101384387 B1 4/2014
WO 2009026599 A1 3/2009

OTHER PUBLICATIONS

International Search Report; ISA/SA; International Application No. PCT/US2025/028173; Aug. 28, 2025; 3 pages.
Written Opinion of the International Searching Authority; ISA/SA; International Application No. PCT/US2025/028173; Aug. 28, 2025; 7 pages.

* cited by examiner

*Primary Examiner* — Mirza F Alam
(74) *Attorney, Agent, or Firm* — Taft Stettinius & Hollister LLP

(57) ABSTRACT

An electronic lock for leveraging always-on lock indicator display technologies according to an embodiment includes a bistable display, at least one processor, and at least one memory comprising a plurality of instructions that, in response to execution by the at least one processor, causes the electronic lock to perform a diagnostic on the electronic lock to determine a status of the electronic lock, determine whether an error has occurred on the electronic lock based on the determined status of the electronic lock, and modify a current display image of the bistable display to display an error code on the bistable display in response to a determination that the error has occurred on the electronic lock, wherein the error code is associated with the error that has occurred on the electronic lock.

18 Claims, 5 Drawing Sheets

ALWAYS-ON LOCK INDICATOR DISPLAY TECHNOLOGIES

BACKGROUND

Access control systems typically involve the use of credentials to manage the operation of an access control device (e.g., an electronic lock). When an error is encountered by an electronic lock, the process of diagnosing the underlying problem is typically cumbersome. For example, in some implementations, a technician may electrically couple a handheld device with the electronic lock onsite, such that the utility software stored on the handheld device can retrieve audit data from the electrical lock for interpretation either onsite by the handheld device or subsequently by a computer after loading the audit data onto that computer.

SUMMARY

One embodiment is directed to a unique system, components, and methods for always-on lock indicator display technologies. Other embodiments are directed to apparatuses, systems, devices, hardware, methods, and combinations thereof for always-on lock indicator display technologies.

According to an embodiment, an electronic lock for leveraging always-on lock indicator display technologies may include a bistable display, at least one processor, and at least one memory comprising a plurality of instructions that, in response to execution by the at least one processor, causes the electronic lock to perform a diagnostic on the electronic lock to determine a status of the electronic lock, determine whether an error has occurred on the electronic lock based on the determined status of the electronic lock, and modify a current display image of the bistable display to display an error code on the bistable display in response to a determination that the error has occurred on the electronic lock, wherein the error code is associated with the error that has occurred on the electronic lock.

In some embodiments, the bistable display may include an electrophoretic display.

In some embodiments, the bistable display may include a bistable liquid crystal display.

In some embodiments, the bistable display may include an electrochromic display.

In some embodiments, to perform the diagnostic on the electronic lock may include to generate audit data for the electronic lock.

In some embodiments, to display the error code on the bistable display in response to the determination that the error has occurred on the electronic lock may include to display a quick response (QR) code on the bistable display.

In some embodiments, to display the error code on the bistable display in response to the determination that the error has occurred on the electronic lock may include to display a bar code on the bistable display.

In some embodiments, to modify the current display image of the bistable display may include to display a link to a website associated with error handling for the error associated with the error code.

In some embodiments, the plurality of instructions may further cause the electronic lock to determine a lock status of the electronic lock in response to a determination that an error has not occurred on the electronic lock, modify the current display image of the bistable display to display a locked status indicator in response to a determination that the electronic lock is locked, and modify the current display image of the bistable display to display an unlocked status indicator in response to a determination that the electronic lock is unlocked.

In some embodiments, the plurality of instructions may further cause the electronic lock to modify the current display image of the bistable display to display a link to a website associated with installation instructions in response to a determination that the electronic lock is in an installation phase of device onboarding.

In some embodiments, the plurality of instructions may further cause the electronic lock to modify the current display image of the bistable display to display a code associated with commissioning details for the electronic lock in response to a determination that the electronic lock is in a commissioning phase of device onboarding.

In some embodiments, to perform the diagnostic on the electronic lock may include to perform the diagnostic on the electronic lock at boot up of the electronic lock.

According to another embodiment, a method for leveraging always-on lock indicator display technologies may include performing, by an electronic lock, a diagnostic on the electronic lock to determine a status of the electronic lock, determining, by the electronic lock, whether an error has occurred on the electronic lock based on the determined status of the electronic lock, and modifying, by the electronic lock, a current display image of a bistable display of the electronic lock to display an error code on the bistable display in response to determining that the error has occurred on the electronic lock, wherein the error code is associated with the error that has occurred on the electronic lock.

In some embodiments, the bistable display may include one of an electrophoretic display, a bistable liquid crystal display, or an electrochromic display.

In some embodiments, performing the diagnostic on the electronic lock may include generating audit data for the electronic lock.

In some embodiments, modifying the current display image of the bistable display to display the error code in response to determining that the error has occurred on the electronic lock may include displaying one of a quick response (QR) code or a barcode on the bistable display.

In some embodiments, modifying the current display image of the bistable display may include displaying a link to a website associated with error handling for the error associated with the error code.

In some embodiments, the method may further include determining, by the electronic lock, a lock status of the electronic lock in response to determining that an error has not occurred on the electronic lock, modifying, by the electronic lock, the current display image of the bistable display to display a locked status indicator in response to determining that the electronic lock is locked, and modifying, by the electronic lock, the current display image of the bistable display to display an unlocked status indicator in response to determining that the electronic lock is unlocked.

In some embodiments, the method may further include modifying, by the electronic lock, the current display image of the bistable display to display a link to a website associated with installation instructions in response to determining that the electronic lock is in an installation phase of device onboarding.

In some embodiments, the method may further include modifying, by the electronic lock, the current display image of the bistable display to display a code associated with commissioning details for the electronic lock in response to determining that the electronic lock is in a commissioning phase of device onboarding.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
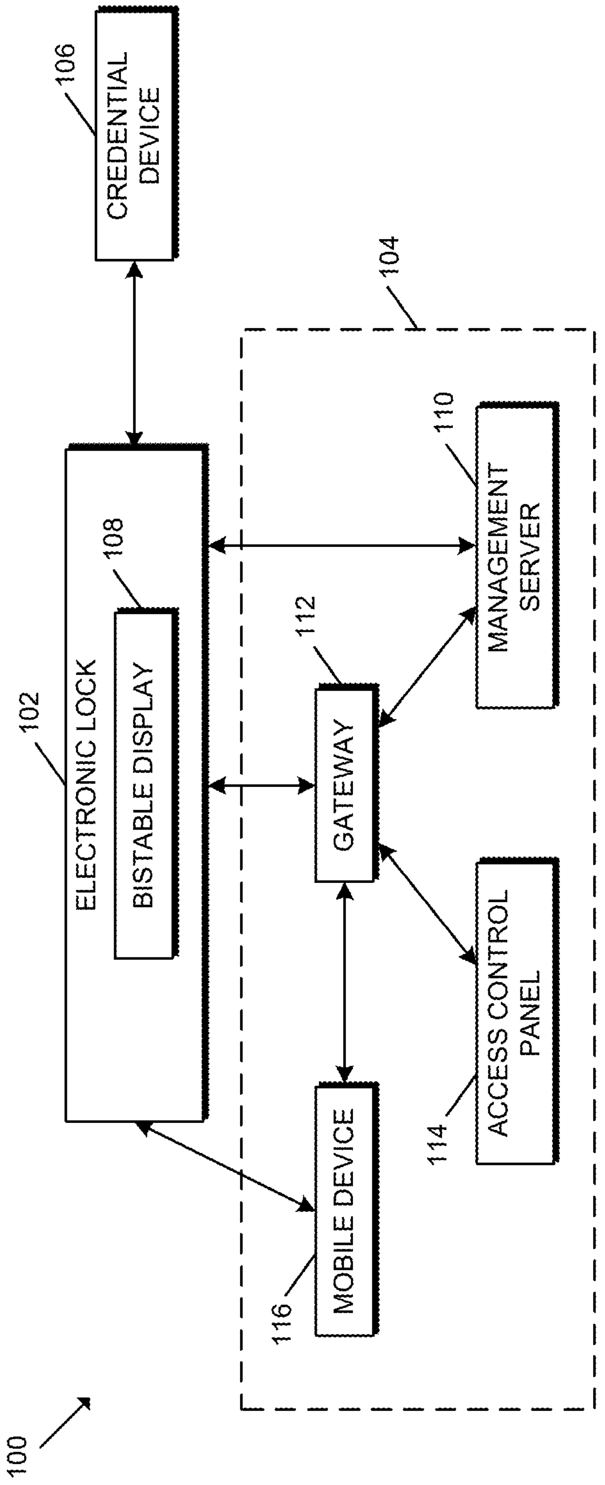
FIG. 1 is a simplified block diagram of at least one embodiment of an access control system for leveraging always-on lock indicator display technologies.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

It should be appreciated that the always-on lock indicator display technologies described herein allow for an individual (e.g., a technician or standard user) at a door to straightforwardly diagnose an issue with an electronic lock without taking additional steps such as connecting the electronic lock via a special application or device for diagnosis. More specifically, the electronic lock may include a low power indicator such as an E-ink display or other type of bistable display to provide the lock/unlock status of the lock. Additionally, in the case of a lock error, the low power indicator may also be used to display a QR code that may be scanned to link to a website that provides error handling instructions related to an error, thereby eliminating the need to contact a support call center and speeding up the diagnostic process in the field. It should be appreciated that the electronic lock may include built-in diagnostics to detect motor failure, loss of inter-board communications, failure to communicate with the communication circuitry (e.g., a BLE module), failure of reader communications, battery health failure, external memory check failure, communication circuitry configuration failure (e.g., Wi-Fi, BLE, Ethernet, etc.), and/or other failure/error states.

In some embodiments, during normal operation, the electronic lock has an always-on indicator showing the lock status of the electronic lock (e.g., locked or unlocked). In the event that an error is detected by the electronic lock, the electronic lock may display a QR code that the user can scan to understand the issue and/or to troubleshoot the lock. For example, the electronic lock may display a link to a website with information on the exact error, one or more error codes that could be looked up online or in a manual, instructions for the user (e.g., the lock is in low battery mode and needs the batteries replaced), a link to a mobile app download at the time of commissioning, and/or other relevant lock-related data to the user.

Referring now to FIG. 1, in the illustrative embodiment, an access control system 100 for leveraging always-on lock indicator display technologies is shown. The illustrative access control system 100 includes an electronic lock 102, a management system 104, and a credential device 106. Further, the electronic lock 102 includes a bistable display 108, and the management system 104 may include a management server 110, a gateway device 112, an access control panel 114, and/or a mobile device 116.

It should be appreciated that the electronic lock 102, the management system 104, the credential device 106, the bistable display 108, the management server 110, the gateway device 112, the access control panel 114, and/or the mobile device 116 may be embodied as any type of device or collection of devices suitable for performing the functions described herein. More specifically, in the illustrative embodiment, the electronic lock 102 may be embodied as any type of device capable of controlling access through a passageway. For example, in various embodiments, the electronic lock 102 may be embodied as a mortise lock, a cylindrical lock, a tubular lock, or a peripheral controller of a passageway. In some embodiments, the electronic lock 102 includes a lock mechanism configured to control access through a passageway. For example, in some embodiments, the lock mechanism may be configured to be positioned in a locked state in which access to the passageway is denied, or positioned in an unlocked state in which access to the passageway is permitted. In some embodiments, the lock mechanism may include a deadbolt, latch bolt, lever, and/or other mechanism adapted to move between the locked and unlocked state and otherwise perform the functions described herein. However, it should be appreciated that the lock mechanism may be embodied as any another mechanism suitable for controlling access through a passageway in other embodiments. Depending on the particular embodiment, the electronic lock 102 may include a credential reader or be electrically/communicatively coupled to a credential reader configured to communicative with credential devices 106. For example, in some embodiments, the electronic lock 102 may include a peripheral controller that is electrically coupled to a user-facing credential reader (e.g., a wall-mounted reader) that includes the bistable display 108.

The bistable display 108 may be embodied as any type of display device or system capable of displaying an image persistently (e.g., indefinitely or substantially indefinitely) without the need for a continuous power source. For example, in the illustrative embodiment, the bistable display 108 is configured to consume power to modify the image displayed thereon and then maintain that newly displayed image with zero or negligible power consumption for an extended period of time (e.g., nominally indefinitely). In some embodiments, it should be appreciated that the bistable display 108 may be embodied as an electrophoretic display (e.g., an E-Ink display), a bistable liquid crystal display (LCD), or an electrochromic display.

In the illustrative embodiment, the credential device 106 may be embodied as any type of mobile device capable of communicating with the electronic lock 102 in order to exchange access-related information and/or otherwise performing the functions described herein. It should be appreciated that the credential device 106 may be embodied as a "passive" or "active" credential device depending on the particular device. For example, the credential device 106 may be embodied as a passive credential device having a credential identifier (e.g., a unique ID) stored therein and "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, one or more passive credentials may be embodied as a proximity card, which is configured to communicate over a low frequency carrier of nominally 125 kHz, and/or a smartcard, which is configured to communicate over a high frequency carrier frequency of nominally 13.56 MHz. In other embodiments, the credential device 106 may be embodied as an "active" credential device such as a smartphone, powered dongle, and/or other mobile device. Accordingly, in some embodiments, it should be appreciated that the credential device 106 may include wireless communication circuitry for communicating with the electronic lock 102 and/or other devices via corresponding protocols (e.g., Wi-Fi, Bluetooth (e.g., including BLE), ZigBee, Z-Wave, Near Field Communication (NFC), Thread, ultra wideband (UWB), etc.).

As described herein, the management system 104 may be configured to manage credentials of the access control system 100. For example, the management system 104 may be responsible for ensuring that the electronic locks 102 have updated authorized credentials, accept lists, block lists, device parameters, and/or other suitable data. Additionally, in some embodiments, the management system 104 may receive security data, audit data, raw sensor data, and/or other suitable data from the electronic locks 102 for management of the access control system 100. In some embodiments, one or more of the devices of the management system 104 may be embodied as an online server or a cloud-based server. Further, in some embodiments, the management system 104 may communicate with multiple electronic locks 102 at a single site (e.g., a particular building) and/or across multiple sites. That is, in such embodiments, the management system 104 may be configured to receive data from electronic locks 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 110, a gateway device 112, an access control panel 114, and/or a mobile device 116 depending on the particular embodiment. The functions of the management system 104 described herein may be performed by one or more of those devices in various embodiments. For example, in some embodiments, the management server 110 may perform all of the functions of the management system 104 described herein. Further, in some embodiments, the gateway device 112 may be communicatively coupled to the electronic lock 102 such that the other devices of the management system 104 (e.g., the management server 110, the access control panel 114, and/or the mobile device 116) may communicate with the electronic lock 102 via the gateway device 112.

In some embodiments, the electronic lock 102 may communicate with the management server 110 over a Wi-Fi connection and/or with the mobile device 116 over a Bluetooth connection. Additionally, the electronic lock 102 may communicate with the management server 110 and/or the access control panel 114 via the gateway device 112. As such, in the illustrative embodiment, the electronic lock 102 may communicate with the gateway device 112 over a Wi-Fi connection and/or a Bluetooth connection, and the gateway device 112 may, in turn, forward the communicated data to the relevant management server 110 and/or access control panel 114. In particular, in some embodiments, the gateway device 112 may communicate with the access control panel 114 over a serial communication link (e.g., using RS-485 standard communication), and the gateway device 112 may communicate with the management server 110 over a Wi-Fi connection, an Ethernet connection, or another wired/wireless communication connection. As such, it should be appreciated that the electronic lock 102 may communicate with the management server 110 via an online mode with a persistent real-time communication connection or via an offline mode (e.g., periodically or in response to an appropriate condition) depending on the particular embodiment (e.g., depending on whether the electronic lock 102 is offline). As indicated above, in other embodiments, it should be appreciated that the electronic lock 102 may communicate with the devices of the management system 104 via one or more other suitable communication protocols (e.g., sub-GHz communication).

It should be appreciated that each of the electronic lock 102, the management system 104, the credential device 106, the management server 110, the gateway device 112, the access control panel 114, and/or the mobile device 116 may be embodied as one or more computing devices similar to the computing device 200 described below in reference to FIG. 2. For example, in the illustrative embodiment, each of the electronic lock 102, the management system 104, the credential device 106, the management server 110, the gateway device 112, the access control panel 114, and the mobile device 116 includes a processing device 202 and a memory 206 having stored thereon operating logic 208 for execution by the processing device 202 for operation of the corresponding device.

It should be further appreciated that, although the management system 104 and the management server 110 are described herein as one or more computing devices outside of a cloud computing environment, in other embodiments, the system 104 and/or server 110 may be embodied as a cloud-based device or collection of devices. Further, in cloud-based embodiments, the system 104 and/or server 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 110 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 110 described herein. For example, when an event occurs (e.g., data is transferred to the system 104 and/or server 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 110), the appropriate virtual function(s) may be executed to perform the actions before eliminating the instance of the virtual function(s).

Although only one electronic lock 102, one management system 104, one credential device 106, one bistable display 108, one management server 110, one gateway device 112, one access control panel 114, and one mobile device 116 are shown in the illustrative embodiment of FIG. 1, the system 100 may include multiple electronic locks 102, management systems 104, credential devices 106, bistable displays 108, management servers 110, gateway devices 112, access control panels 114, and/or mobile devices 116 in other embodiments. For example, as indicated above, the server 110 may be embodied as multiple servers in a cloud computing environment in some embodiments. Further, each user may be associated with one or more separate credential devices 106 in some embodiments.

Figure 2:
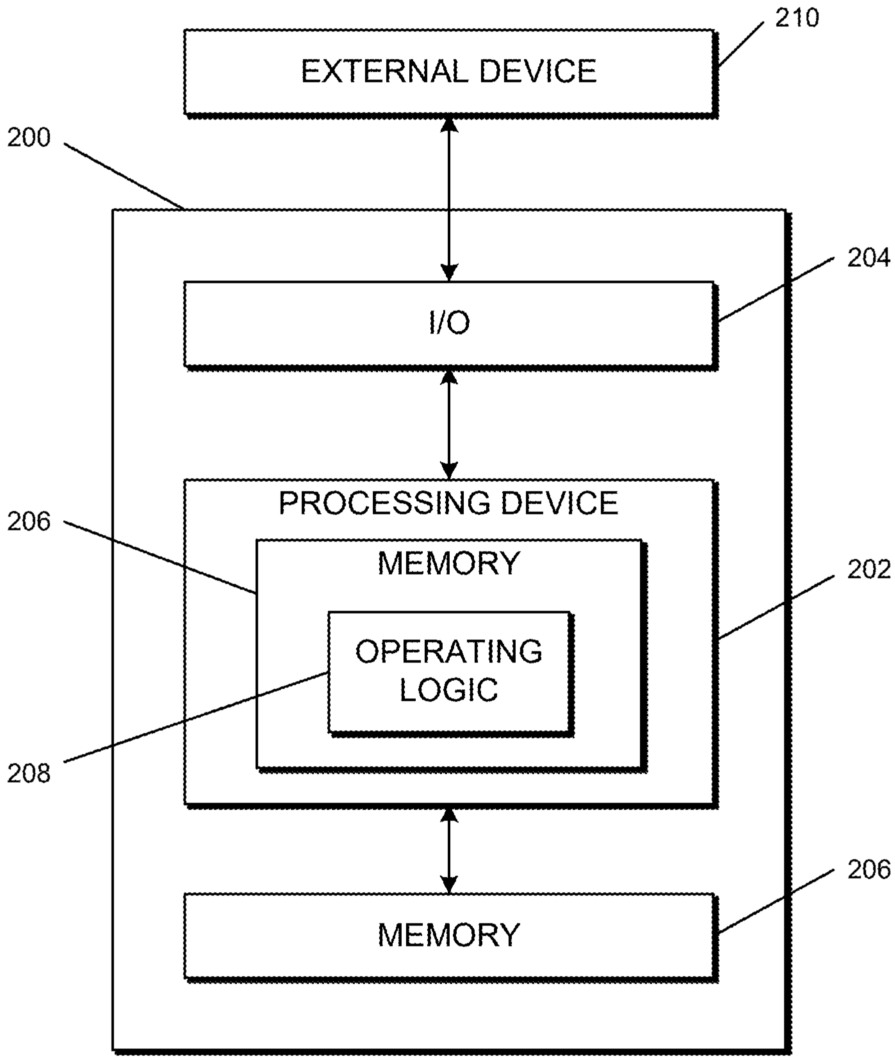
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of an electronic lock, credential device, mobile device, management server, gateway device, and/or access control panel that may be utilized in connection with the electronic lock 102, the management system 104, the credential device 106, the management server 110, the gateway device 112, the access control panel 114, and/or the mobile device 116 illustrated in FIG. 1. Depending on the particular embodiment, computing device 200 may be embodied as a reader device, credential device, electronic lock, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the electronic lock 102, the management system 104, the credential device 106, the management server 110, the gateway device 112, the access control panel 114, and/or the mobile device 116. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
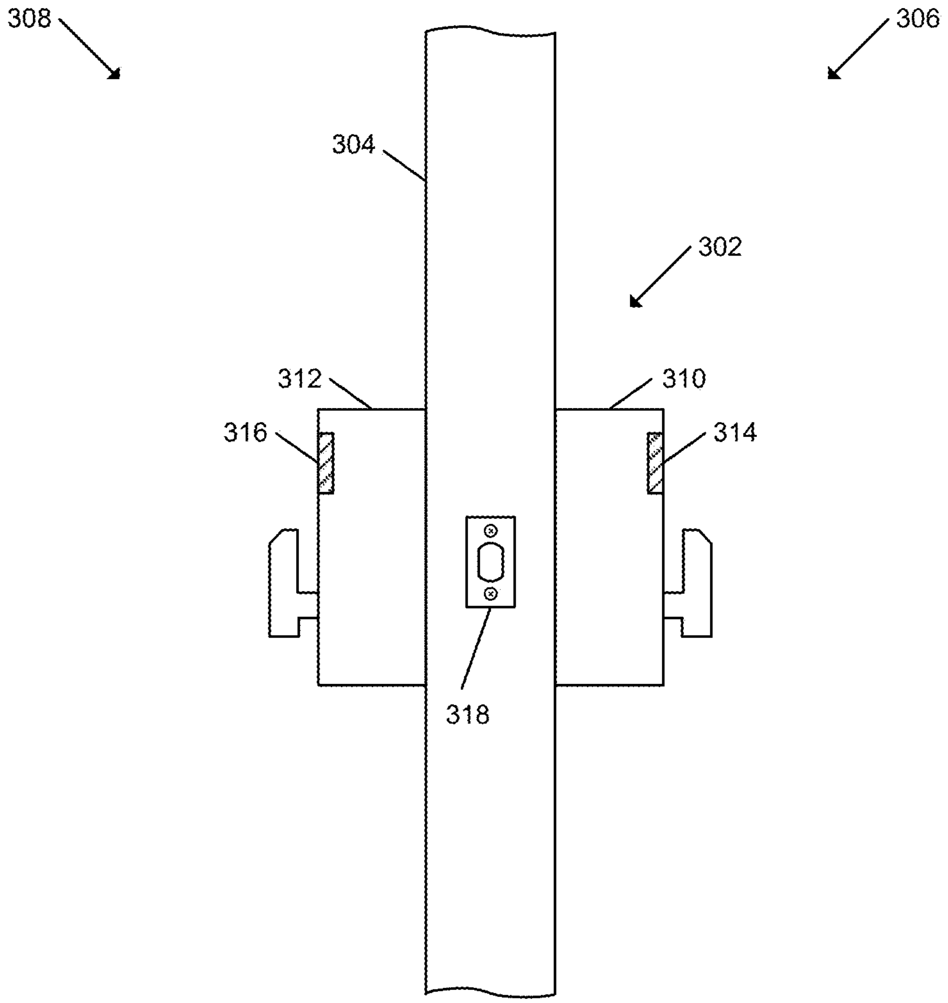
FIG. 3 is a side view of at least one embodiment of an electronic lock for leveraging always-on lock indicator display technologies.

Referring now to FIG. 3, in some embodiments, the electronic lock 102 may be embodied as an electronic lock similar to the electronic lock 302 of FIG. 3, which is secured to a door 304 and configured to control passage through the door 304. It should be appreciated that the door 304 has a secure side 306 (e.g., an exterior side of a perimeter door) and an unsecure side 308 (e.g., an interior side of a perimeter door). Further, as shown, the illustrative electronic lock 302 has a housing defined at least in part by an exterior escutcheon 310 configured to be secured at or to a secure side 306 of the door 304 and an interior escutcheon 312 configured to be secured at or to an unsecure side 308 of the door 304. In the illustrative embodiment, the electronic lock 302 includes a bistable display 314 that is positioned on the exterior escutcheon 310 and a bistable display 316 that is positioned on the interior escutcheon. It should be appreciated that each of the bistable displays 314, 316 may be embodied as a bistable display similar to be bistable display 108 described in reference to the electronic lock 102 of FIG. 1. Although the illustrative electronic lock 302 includes two bistable displays 314, 316, it should be appreciated that the electronic lock 302 may include only a single bistable display in some embodiments (e.g., either the bistable display 314 or the bistable display 316). Further, in yet other embodiments, the electronic lock 302 may include more than two bistable displays. In the illustrative embodiment, images presented on the bistable display 314 and the bistable display 316 are visible to users approaching the electronic lock 302 from the secure side 306 or unsecure side 308 of the door, respectively.

Although the escutcheons and sides are described herein with reference to "interior" and "exterior," it should be appreciated that such terminology is used simply for convenience and brevity of the description. For example, in some embodiments, both sides of the door 304 may be interior in the sense that both sides of the door 304 are within the perimeter of a building (e.g., as for a wholly interior door). Additionally, although the illustrative embodiment depicts the electronic lock 302 as being secured to the door 304, it should be appreciated that the electronic lock 302 (or other embodiment of the electronic lock 102) may be secured to a different structure in other embodiments (e.g., the door frame, a wall, etc.). For example, in some embodiments, the electronic lock 102 may be embodied as a wall-mounted reader or peripheral controller.

The illustrative electronic lock 302 includes a lock mechanism 318, which may be similar to the lock mechanism described above in reference to FIG. 1. In particular, the illustrative lock mechanism 318 may include a deadbolt, latch bolt, lever, and/or other mechanism that may be positioned in a locked state to secure the door 304 and prevent passage through the door 304 (i.e., when the door 304 is closed) or may be positioned in an unlocked state to allow passage through the door 304. Further, in some embodiments, the electronic lock 302 may include various sensors to detect the status of the lock mechanism 318 (e.g., locked/unlocked), which may be displayed on the bistable displays 314, 316.

Figure 4:
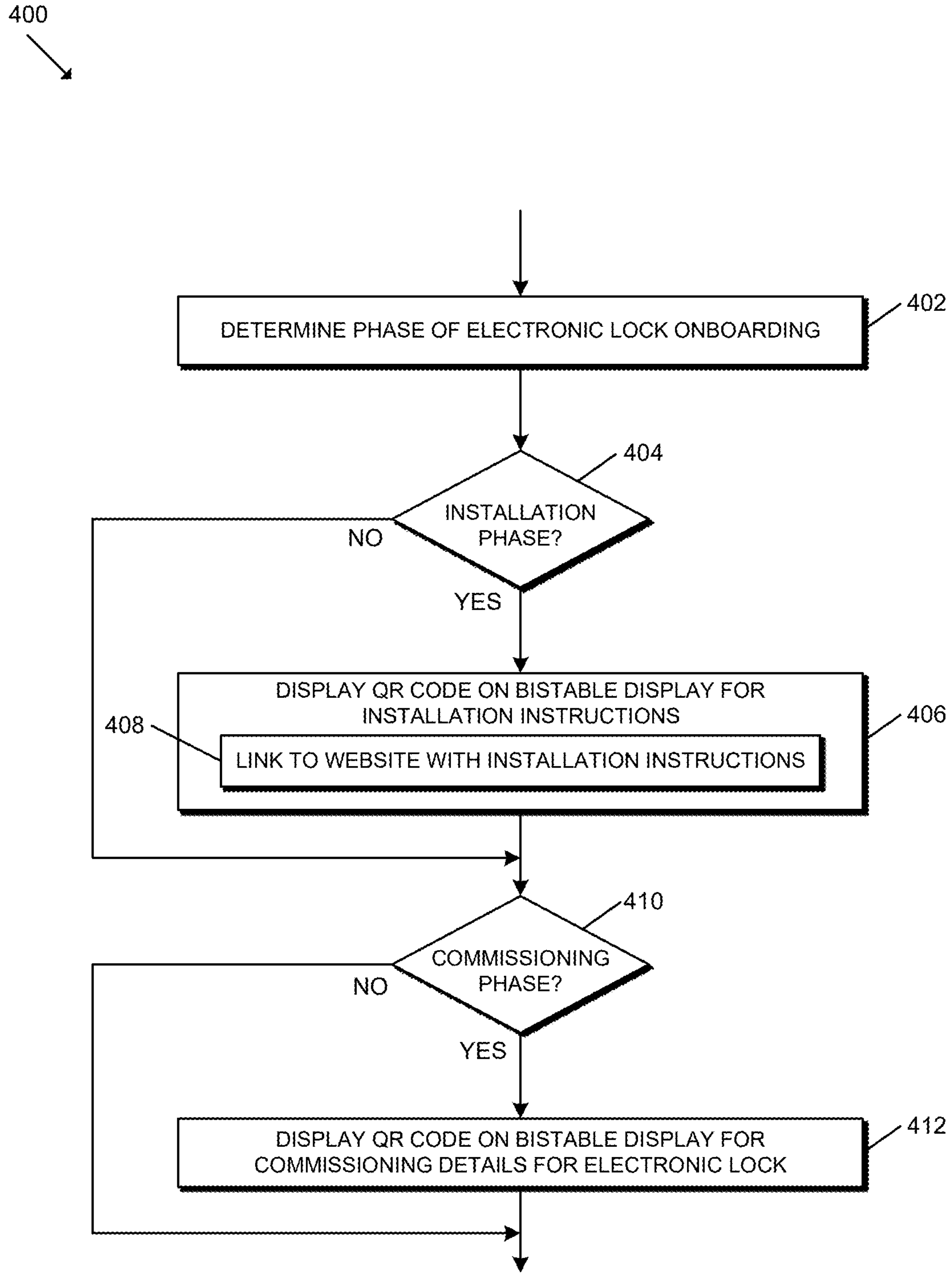
FIG. 4 is a simplified flow diagram of at least one embodiment of a method for leveraging always-on lock indicator display technologies during onboarding of an electronic lock.

Referring now to FIG. 4, in use, the electronic lock 102 may execute a method 400 for leveraging always-on lock indicator display technologies during onboarding of an electronic lock. It should be appreciated that the particular blocks of the method 400 are illustrated by way of example, and such blocks may be combined or divided, added or removed, and/or reordered in whole or in part depending on the particular embodiment, unless stated to the contrary. Although the description of FIG. 4 applies equally to the electronic lock 302 in various embodiments, it should be appreciated that FIG. 4 is described in reference to the electronic lock 102 for brevity of the description.

The illustrative method 400 begins with block 402 in which the electronic lock 102 determines the phase of the electronic lock onboarding process (e.g., installation phase, commissioning phase, operation phase, etc.). If the electronic lock 102 determines, in block 404, that the electronic lock 102 is in an installation phase of device onboarding, the method 400 advances to block 406 in which the electronic lock 102 may display a quick response (QR) code on the bistable display 108 for installation instructions. In particular, in block 408, the electronic lock 102 may display a QR code that links to a website associated with installation instructions on the bistable display 108. For example, in some embodiments, the website may include text, audio, and/or video instructions for installing the electronic lock 102. Although described herein as displaying a QR code, it should be appreciated that the electronic lock 102 may display a bar code and/or another type of code in other embodiments. Further, in some embodiments, the electronic lock 102 may display the installation instructions themselves directly on the bistable display 108. The method 400 advances to block 410.

If the electronic lock 102 determines, in block 404, that the electronic lock is not in an installation phase of device onboarding, the method 400 advances to block 410 in which the electronic lock 102 determines whether the electronic lock 102 is in a commissioning phase of device onboarding. If so, the method 400 advances to block 412 in which the electronic lock 102 may display a QR code on the bistable display 108 associated with commissioning details for the electronic lock 102. For example, in some embodiments, the electronic lock 102 may display a QR code that links to a website that includes the commissioning details. In another embodiment, the electronic lock 102 may display a link that allows for automated downloading of the commissioning details. Although described herein as displaying a QR code, it should be appreciated that the electronic lock 102 may display a bar code and/or another type of code in other embodiments. Further, in some embodiments, the electronic lock 102 may display the commissioning details themselves directly on the bistable display 108.

Although the blocks 402-412 are described in a relatively serial manner, it should be appreciated that various blocks of the method 400 may be performed in parallel in some embodiments. It should be further appreciated that, in some embodiments, the bistable display 108 may be used for displaying various other data related to the installation of the electronic lock 102 or otherwise. For example, in some embodiments, the bistable display 108 may display a signal strength indicator of a wireless communication connection between the electronic lock 102 and another computing device (e.g., a gateway device).

Figure 5:
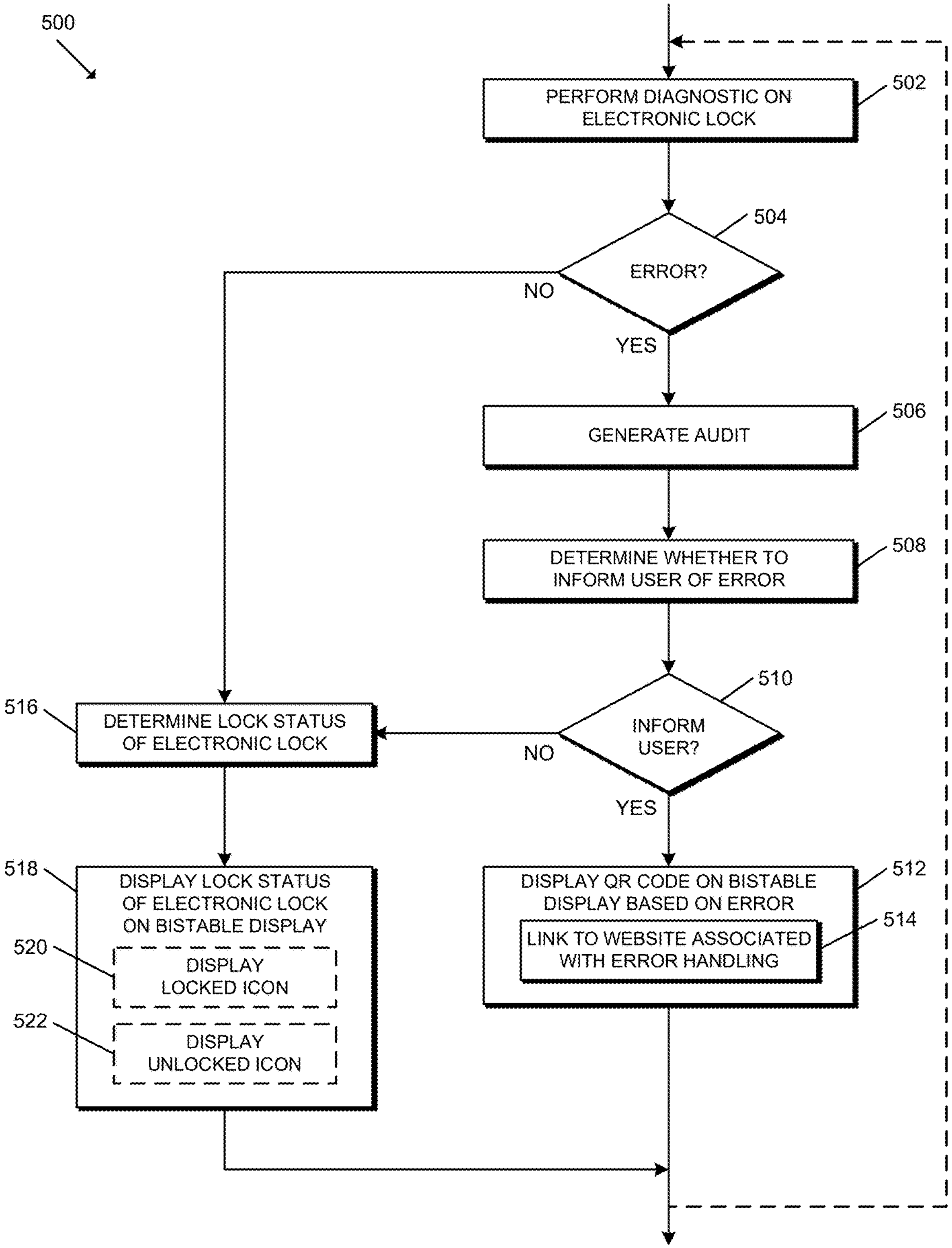
FIG. 5 is a simplified flow diagram of at least one embodiment of a method for leveraging always-on lock indicator display technologies during operation of an electronic lock.

Referring now to FIG. 5, in use, the electronic lock 102 may execute a method 500 for leveraging always-on lock indicator display technologies during operation of an electronic lock. It should be appreciated that the particular blocks of the method 500 are illustrated by way of example, and such blocks may be combined or divided, added or removed, and/or reordered in whole or in part depending on the particular embodiment, unless stated to the contrary. Although the description of FIG. 5 applies equally to the electronic lock 302 in various embodiments, it should be appreciated that FIG. 5 is described in reference to the electronic lock 102 for brevity of the description.

The illustrative method 500 begins with block 502 in which the electronic lock 102 performs a diagnostic on itself to determine the status of the electronic lock 102. For example, the electronic lock 102 may execute one or more diagnostic algorithms to determine the operational status of the electronic lock 102 or the components thereof, such as determining whether any errors has occurred (or is occurring) with the electronic lock 102 (e.g., non-operational sensor, firmware error, mechanical failure, boot error, etc.). In some embodiments, the electronic lock 102 performs a diagnostic on itself to determine its status at boot up of the electronic lock 102. Further, it should be appreciated that the electronic lock 102 may perform diagnostics in response to other criteria in other embodiments (e.g., periodically, in response to a flag being set in the system indicative of a potential error, user-initiated, etc.).

In block 504, the electronic lock 102 determines whether an error has occurred on the electronic lock 102 based on the status determined from the diagnostic performed on the electronic lock 102. If the electronic lock 102 determines, in block 504, that an error has occurred on the electronic lock 102, the method 500 advances to block 506 in which the electronic lock 102 generates audit data associated with the error, which may be stored on the electronic lock 102 (e.g., for retrieval by another device, viewing by the user during troubleshooting, etc.). In block 508, the electronic lock 102 determines whether to inform the user of the error. For example, in some embodiments, the electronic lock 102 may determine to inform the user of certain errors (e.g., errors likely to affect the functionality of the electronic lock 102) and maintain audit data without informing the user of other errors (e.g., errors unlikely to affect the functionality of the electronic lock 102).

If the electronic lock 102 determines, in block 510, to inform the user of the error, the method 500 advances to block 512 in which the electronic lock 102 modifies the image being displayed (if any) on the bistable display 108 to display a QR code on the bistable display 108 associated with the identified error. More specifically, in block 514, the electronic lock 102 may display a QR code that links to a website associated with error handling for the identified error. Although described herein as displaying a QR code, it should be appreciated that the electronic lock 102 may display a bar code and/or another type of error code associated with the error in other embodiments. Further, in some embodiments, the electronic lock 102 may display error details and/or error handling instructions directly on the bistable display 108.

Returning to block 504, if the electronic lock 102 determines that no error has occurred, the method 500 advances to block 516. Similarly, if the electronic lock 102 determines that an error has occurred in block 504 but subsequently determines, in block 510, not to inform the user of the error, the method 500 likewise advances to block 516. In block 516, the electronic lock 102 determines the lock status (e.g., locked/unlocked) of the electronic lock 102. As described herein, it should be appreciated that the lock status may be associated with the status of the lock mechanism, various latches, door position, and/or other door- or lock-related conditions. In the illustrative embodiment, the lock status of the electronic lock 102 is determined to be either in a locked state or an unlocked state. In block 518, the electronic lock 102 modifies the image being displayed (if any) on the bistable display 108 to display the lock status of the electronic lock 102. For example, the electronic lock 102 may display lock status indicia, which may be a textual or symbolic representations indicative of the lock status of the electronic lock 102. In particular, if the electronic lock 102 is in a locked state, in block 520, the electronic lock 102 may modify the image being displayed on the bistable display 108 to display a locked status indicator (e.g., a lock icon), which indicates that the electronic lock 102 is in a locked state. If the electronic lock 102 is in an unlocked state, in block 522, the electronic lock 102 may modify the image being displayed on the bistable display 108 to display an unlocked status indicator (e.g., an unlock icon), which indicates that the electronic lock 102 in an unlocked state. It should be further appreciated that, although the illustrative embodiment only describes two locked states (e.g., locked/unlocked), the electronic lock 102 may display additional and/or alternative states in other embodiments.

In some embodiments, it should be appreciated that the method 500 may return to block 502, 504, or 516 such that the electronic lock 102 may continuously or periodically monitor various aspects described herein and adjust the images displayed on the bistable display 108 accordingly.

Although the blocks 502-522 are described in a relatively serial manner, it should be appreciated that various blocks of the method 500 may be performed in parallel in some embodiments.

What is claimed is:

1. An electronic lock for leveraging always-on lock indicator display technologies, the electronic lock comprising:
- a bistable display;
- at least one processor; and
- at least one memory comprising a plurality of instructions that, in response to execution by the at least one processor, causes the electronic lock to:
- perform a diagnostic on the electronic lock to determine a status of the electronic lock;
- determine whether an error has occurred on the electronic lock based on the determined status of the electronic lock;
- modify a current display image of the bistable display to display an error code on the bistable display in response to a determination that the error has occurred on the electronic lock, wherein the error code is associated with the error that has occurred on the electronic lock;
- determine a lock status of the electronic lock in response to a determination that an error has not occurred on the electronic lock;
- modify the current display image of the bistable display to display a locked status indicator in response to a determination that the electronic lock is locked; and
- modify the current display image of the bistable display to display an unlocked status indicator in response to a determination that the electronic lock is unlocked.

2. The electronic lock of claim 1, wherein the bistable display comprises an electrophoretic display.

3. The electronic lock of claim 1, wherein the bistable display comprises a bistable liquid crystal display.

4. The electronic lock of claim 1, wherein the bistable display comprises an electrochromic display.

5. The electronic lock of claim 1, wherein to perform the diagnostic on the electronic lock comprises to generate audit data for the electronic lock.

6. The electronic lock of claim 1, wherein to display the error code on the bistable display in response to the determination that the error has occurred on the electronic lock comprises to display a quick response (QR) code on the bistable display.

7. The electronic lock of claim 1, wherein to display the error code on the bistable display in response to the determination that the error has occurred on the electronic lock comprises to display a bar code on the bistable display.

8. The electronic lock of claim 1, wherein to modify the current display image of the bistable display comprises to display a link to a website associated with error handling for the error associated with the error code.

9. The electronic lock of claim 1, wherein the plurality of instructions further causes the electronic lock to modify the current display image of the bistable display to display a link to a website associated with installation instructions in response to a determination that the electronic lock is in an installation phase of device onboarding.

10. The electronic lock of claim 1, wherein the plurality of instructions further causes the electronic lock to modify the current display image of the bistable display to display a code associated with commissioning details for the electronic lock in response to a determination that the electronic lock is in a commissioning phase of device onboarding.

11. The electronic lock of claim 1, wherein to perform the diagnostic on the electronic lock comprises to perform the diagnostic on the electronic lock at boot up of the electronic lock.

12. A method for leveraging always-on lock indicator display technologies, the method comprising:

performing, by an electronic lock, a diagnostic on the electronic lock to determine a status of the electronic lock;

determining, by the electronic lock, whether an error has occurred on the electronic lock based on the determined status of the electronic lock;

modifying, by the electronic lock, a current display image of a bistable display of the electronic lock to display an error code on the bistable display in response to determining that the error has occurred on the electronic lock, wherein the error code is associated with the error that has occurred on the electronic lock;

determining, by the electronic lock, a lock status of the electronic lock in response to determining that an error has not occurred on the electronic lock;

modifying, by the electronic lock, the current display image of the bistable display to display a locked status indicator in response to determining that the electronic lock is locked; and modifying, by the electronic lock, the current display image of the bistable display to display an unlocked status indicator in response to determining that the electronic lock is unlocked.

13. The method of claim 12, wherein the bistable display comprises one of an electrophoretic display, a bistable liquid crystal display, or an electrochromic display.

14. The method of claim 12, wherein performing the diagnostic on the electronic lock comprises generating audit data for the electronic lock.

15. The method of claim 12, wherein modifying the current display image of the bistable display to display the error code in response to determining that the error has occurred on the electronic lock comprises displaying one of a quick response (QR) code or a barcode on the bistable display.

16. The method of claim 12, wherein modifying the current display image of the bistable display comprises displaying a link to a website associated with error handling for the error associated with the error code.

17. The method of claim 12, further comprising modifying, by the electronic lock, the current display image of the bistable display to display a link to a website associated with installation instructions in response to determining that the electronic lock is in an installation phase of device onboarding.

18. The method of claim 12, further comprising modifying, by the electronic lock, the current display image of the bistable display to display a code associated with commissioning details for the electronic lock in response to determining that the electronic lock is in a commissioning phase of device onboarding.

* * * * *